June 2, 1970　　　S. J. SACKS ET AL　　　3,516,084
ANALOG-TO-DIGITAL CONVERTER

Filed July 17, 1967　　　　　　　　　　　　　　4 Sheets-Sheet 2

INVENTORS
STEPHEN J. SACKS
JOHN E. SCOTT
BY
S. C. Yeaton
ATTORNEY

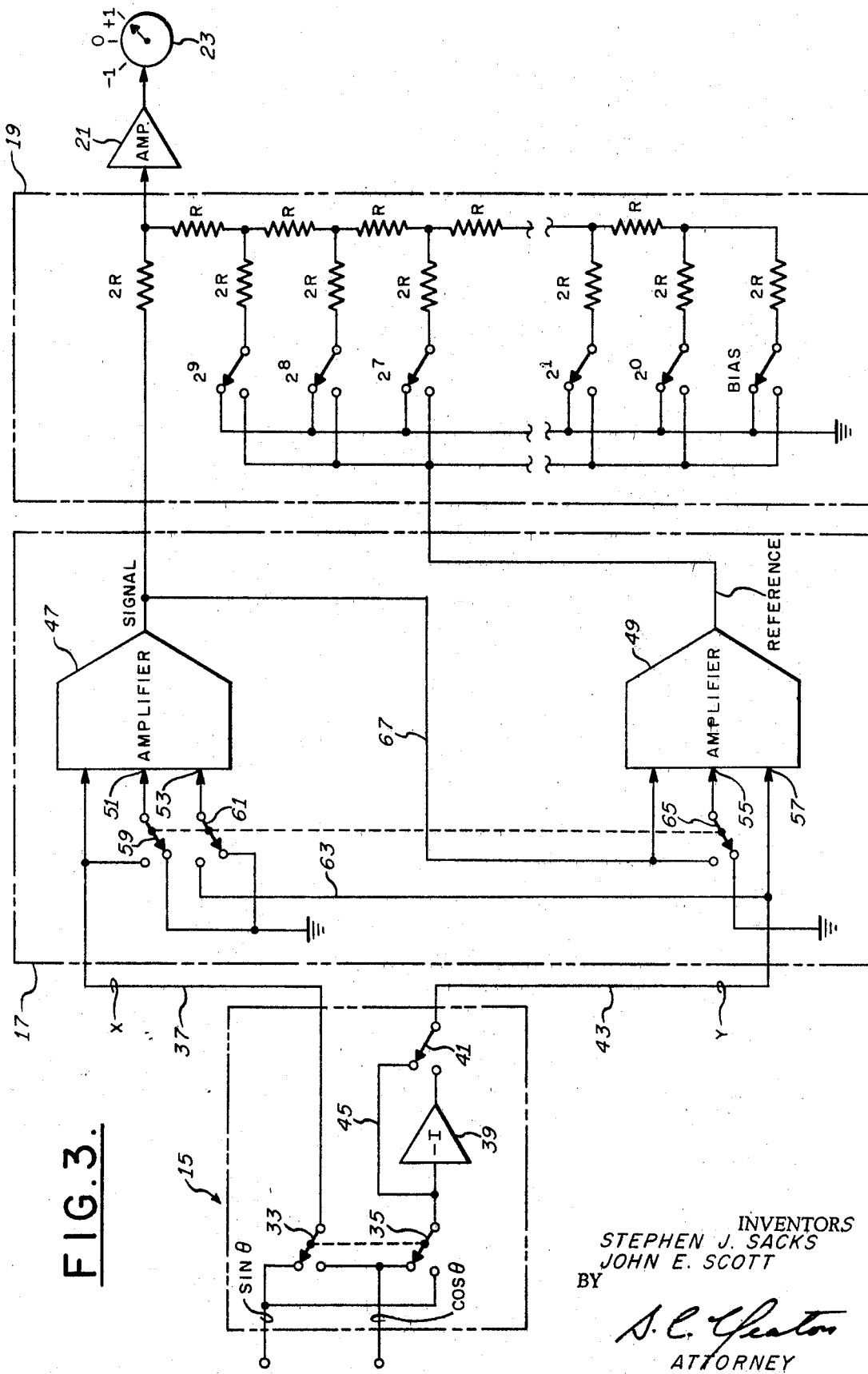

United States Patent Office 3,516,084
Patented June 2, 1970

3,516,084
ANALOG-TO-DIGITAL CONVERTER

Stephen J. Sacks, Amityville, and John E. Scott, Rego Park, N.Y., assignors to Sperry Rand Corporation, a corporation of Delaware
Filed July 17, 1967, Ser. No. 653,980
Int. Cl. G06g 7/22; H03k 13/17
U.S. Cl. 340—347                    9 Claims

ABSTRACT OF THE DISCLOSURE

A three-wire synchro signal representing an angle $\theta$ is converted into two-wire sine and cosine signals. The polarity of each of the sine and cosine signals as well as the relative magnitude of these two signals are determined and used to indicate the octant in which the angle $\theta$ lies. The sine and cosine signals are passed through operational amplifiers that produce a resultant interpolation signal that is a linear function of the unknown angle within the indicated octant. This interpolation signal is converted into its binary equivalent in a ratio encoder.

---

The invention herein described was made in the course of or under a contract, or subcontract thereunder, with the Department of the Navy.

BACKGROUND OF THE INVENTION

This invention relates to computers and more specifically to computer components for converting analog signals to their equivalent digital signals.

Many varieties of converters are known in the prior art. These converters may be used for converting analog signals or synchro signals into binary coded form with varying degrees of accuracy.

In one type of synchro-to-digital converter, the three-wire synchro signal representing a rotor angle $\theta$ is converted into the two-wire sine and cosine equivalent. These two signals are compared to determine the sector in which the angle $\theta$ lies and then converted into binary representations of the angle within that sector by means of a successive approximation voltage-to-digital converter that is weighted to compensate for the non-linearity of the trigonometric functions involved.

Since the non-linear successive approximation encoder of the prior art must be custom designed to encode a particular type of analog signal, a separate channel must be supplied for each type of analog signal to be encoded.

Furthermore, the prior art devices produce an error function that is irregular and contains several discontinuities.

These prior art devices may be used with plural input signals, but the complexity of the circuit limits the number and the types of input sources that may be accommodated.

SUMMARY OF THE INVENTION

The present invention overcomes these and other problems of the prior art by using operational amplifiers to produce a linearized interpolation signal that can be encoded in a conventional linear ratio encoder.

BRIEF DESCRIPTION OF THE DRAWINGS

FIG. 3 is a diagram illustrating a presently preferred embodiment of the invention.

DESCRIPTION OF THE PREFERRED EMBODIMENT

The present invention finds greatest utility in converting synchro signals into their binary equivalents. It will be shown, however, that many other types of the analog signals may be accommodated in the same conversion channels that are used for the synchro signal conversion.

In the presently preferred embodiment of the invention, a 13-bit code is used. The three most significant bits represent the octant in which the unknown rotor angle lies. The remaining bits are used as interpolation indicators to locate the unknown rotor angle within the indicated octant.

Thus, the angular values corresponding to various bits are:

| Bit | Bit weight (deg.) | Bit | Bit weight (deg.) |
|---|---|---|---|
| $2^{12}$ | 180 | $2^{5}$ | 1.406 |
| $2^{11}$ | 90 | $2^{4}$ | 0.703 |
| $2^{10}$ | 45 | $2^{3}$ | 0.352 |
| $2^{9}$ | 22.5 | $2^{2}$ | 0.176 |
| $2^{8}$ | 11.25 | $2^{1}$ | 0.088 |
| $2^{7}$ | 5.625 | $2^{0}$ | 0.044 |
| $2^{6}$ | 2.813 | | |

Figure 1:
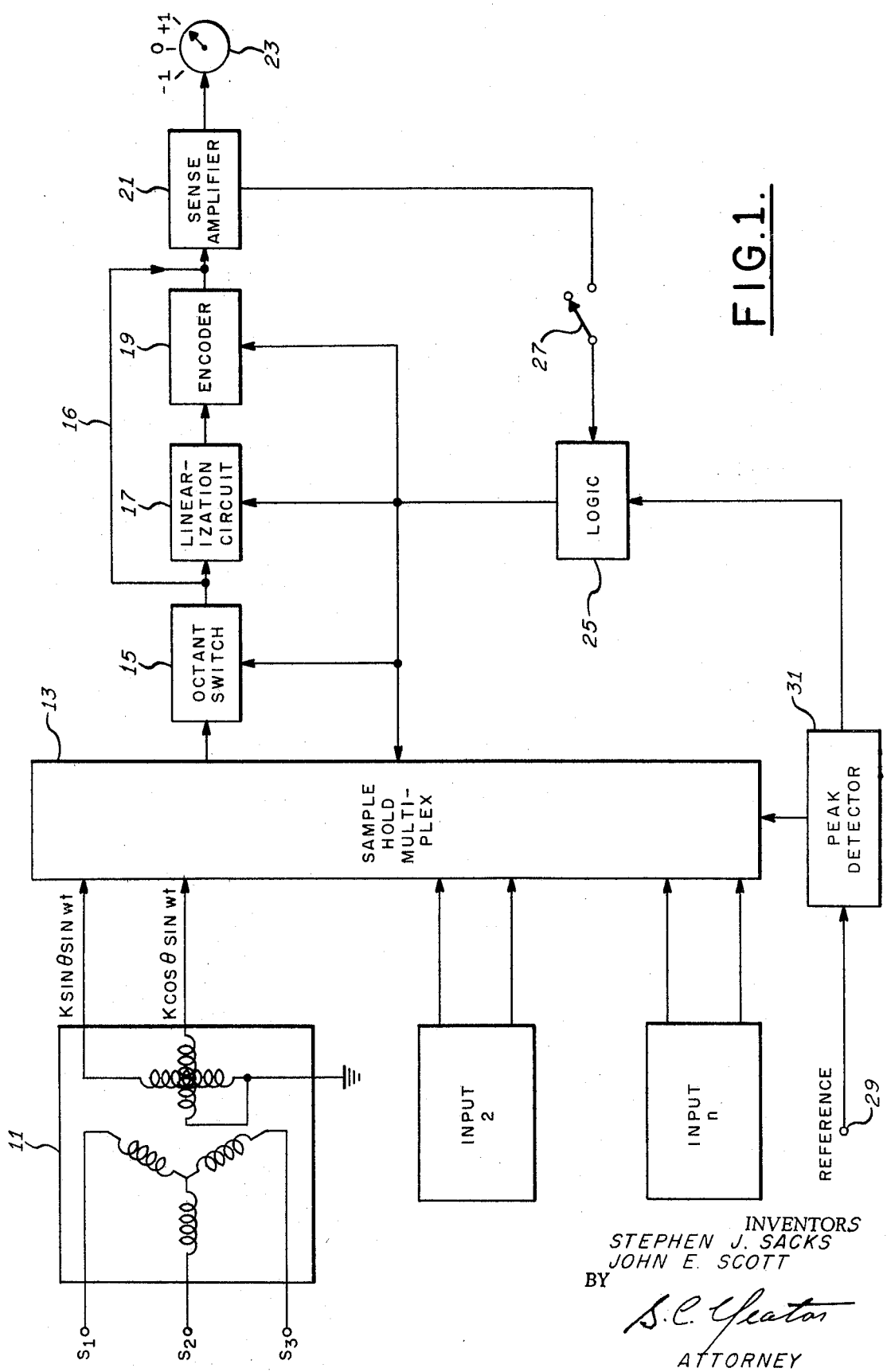
FIG. 1 is a block diagram illustrating the general organization of a circuit employing the invention.

The functional organization of the device may be understood by referring to FIG. 1.

The three-wire synchro signal is applied to a transolver 11. This device may be any one of a class of known devices for converting a synchro signal into its two-wire equivalent. Scott T transformers, for instance, are frequently used for this purpose. The output of the transolver consists of a pair of sinusoidal voltages (of radian frequency $\omega$) having amplitudes proportional to the sine and cosine of the desired rotor angle respectively. These voltages are applied to a selection means 13. This selection means serves to sample the peak amplitude of each signal from the transolver 11 and to store voltages representing these peak amplitudes until they are needed. The selection means also serves as a multiplexer so that signals from additional inputs such as the input 2 or the input $n$ may be processed.

The sampling means in the unit 13 is conventional. A synchronous switch, for instance, may be operated in response to a reference signal to pass voltages at the peak of the sine waves from the input units. Voltages passing through the synchronous switches may then be stored on shunt capacitors which serve to hold these peak voltages until ready for use by the succeeding components in the circuit.

The octant in which the angle $\theta$ lies is first determined by applying the desired signals from the selection means 13 to the octant switch 15. For the octant determination, the normal functions of a linearization circuit 17 and an encoder 19 are effectively bypassed as indicated functionally by the shunt 16 in FIG. 1.

The polarity of the sin $\theta$ and the cos $\theta$ signals are sampled sequentially and indicated on an indicator 23. A determination of whether or not the magnitude of the cos $\theta$ signal exceeds the sin $\theta$ signal is then made and indicated on the unit 23.

As will be shown, these three items of information may then be used to determine the three highest order bits in the binary coded signal so as to define the octant in which the unknown angle lies.

After determination of the octant in which the angle $\theta$ lies, a signal from the octant switch is passed through the linearization circuit 17. In this circuit, the various voltages from the octant switch are transformed by means of operational amplifiers into voltages having an amplitude that is substantially proportional to the angle θ within the indicated octant.

Because the output from the circuit 17 is substantially linear, the signal from this circuit may be applied directly to a linear encoder 19 and amplified in a sense amplifier 21 for use in an appropriate indicator circuit 23.

The output of the sense amplifier may be applied to a logic means 25 through a switch means 27 in order to provide a suitable switching sequence to the various elements in the conversion chain. Synchronization ordinarily is performed by means of a conventional clock pulse source in the logic 25.

The indicating means 23 is shown functionally. In its simplest form it may constitute any device that will react to the output of the sense amplifier 21. Ordinarily, the sense amplifier will provide a positive or negative signal depending upon the condition of the encoder. In such a situation, the reading of the indicator 23 would indicate a binary ONE for a signal of a given polarity from the sense amplifier and a binary ZERO for a signal of the opposite polarity from the sense amplifier.

Thus, the converter may be operated manually and when each step in a decoding sequence is performed, various switches in the device may be set according to the indications on unit 23 before the next step in the sequence is performed. Ordinarily, however, straightforward logic circuits would be used to set the various switches in response to the sense amplifier output.

Figure 2:
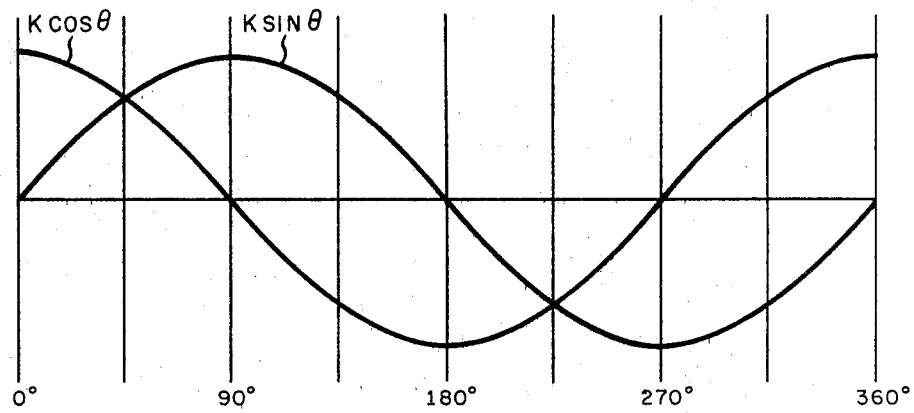
FIGS. 2 and 4 are graphs useful in explaining the operation of the invention.

The octant switching unit 15 operates in accordance with the relationships depicted in FIG. 2.

The graph in FIG. 2 indicates the instantaneous peak values of the signals from the transolver 11 as the rotor angle θ is shifted throughout the range of 0° to 360°.

The tabular portion of FIG. 2 indicates, in binary form, the polarity of the two signals from the transolver as well as the comparative absolute magnitude of these two signals. Thus, in the first octant, $K \cos \theta$ and $K \sin \theta$ are both positive in polarity and are represented in the table as binary ONE's. Similarly, in the first octant, the cosine has a magnitude equal to or greater than the sine. Therefore, this value is indicated as binary ONE in the table.

By referring to the table, it will be noticed that each octant may be represented by a unique combination of these three binary digits. It can be seen, therefore, that for a given θ, observation of the three quantities will serve to define the octant in which the angle β lies.

In the preferred embodiment shown in FIG. 3, a pair of signals from the selection means is applied to the sine θ and cosine θ terminals of the octant switch 15 and through a pair of ganged interchange switches 33 and 35. The output from the switch 33 is applied through a line 37 to one input terminal of the linearization circuit 17. The signal from the switch 35 is applied to an inverting amplifier 39 through a reversing switch 41 and a line 43 to the linearization circuit 17.

Alternatively, the signal from the switch 35 may also be applied directly to the reversing switch 41 through a shunt line 45.

The signals on the lines 37 and 43 may be described as X and Y signals, respectively, for convenience.

The X signal is applied to a first operational amplifier 47 and the Y signal is applied directly to a second operational amplifier 49. The operational amplifier 47 contains two additional inputs 51 and 53. Similarly, the second operational amplifier 49 contains two additional inputs 55 and 57. The gain of these amplifiers is determined by the inputs that are actuated, as will be described.

The input 51 is applied through a switch 59 which may be connected to ground or connected to receive the input signal X. The input terminal 53 is applied through a switch 61 which may be connected to ground or to a line 63 so as to receive a Y signal.

The signal applied to the terminal 55 of the amplifier 49 is applied through a switch 65 which may be connected to ground or to the output of the amplifier 47 through a line 67.

The switches 59, 61 and 65 are ganged together. They operate as interval switches and are actuated in accordance with the portion of an octant being investigated. Their function will be described later.

The voltage from the amplifier 47 constitutes a "signal" voltage which is applied to one input of the encoder 19. Similarly, the output of the amplifier 49 constitutes a "reference" voltage which is also applied to the encoder 19.

Any conventional linear ratio encoder may be used for the encoder 19. In the presently preferred embodiment of FIG. 3, the encoder 19 is a standard ten-bit, linear, successive approximation encoder containing an $R/2R$ binary ladder network. The output fo the encoder 19 is applied through a sense amplifier 21 to the indicator 23.

The encoder translates the ratio of voltages from the amplifiers 47 and 49 into the equivalent binary number. Therefore, if the operational amplifiers were not employed, a tangent function would be applied to the encoder. Since a tangent function is decidedly non-linear, the decoded result would contain serious errors.

Figure 4:
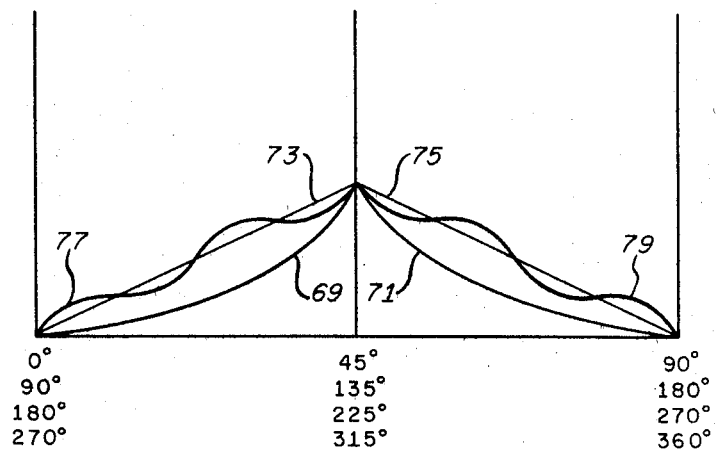

The function of the linearization circuit can be visualized by referring to FIG. 4. If $\sin \theta$ and $\cos \theta$ signals were applied directly to the encoder, the ratio would be a tangent or cotangent function as represented by the lines 69 and 71. Although the curvature of these lines is exaggerated for purposes of explanation, it is evident that serious errors could occur. The ideal response would be the linear curves 73 and 75.

The present invention utilizes operational amplifiers designed according to an empirical formula to provide zero errors at several points within an octant. The response of the presently preferred embodiment is indicated by the curves 77 and 79 although the curvatures of these lines have been exaggerated for purposes of illustration. In a practical embodiment, the maximum error in the operational amplifiers amounted to 3.2 minutes of arc.

The operational amplifiers are designed according to the empirical linearization formula:

$$\frac{AX-BY}{Y+CX} \approx K\theta = \frac{\text{signal}}{\text{reference}}$$

where A, B, C and K are constants and X and Y are the $\sin \theta$ and $\cos \theta$ signals applied to the linearization circuit 17 in the manner pictured in FIG. 3.

In order to provide suitable signals for the ratio encoder, the signal-to-reference ratio should not exceed unity. Therefore, the interchange switches 33 and 35 are actuated in response to the results of the octant determination so as to assure that the larger of the sine and cosine voltages is applied to the amplifier 49. Thus, for octants in which $\cos \theta$ is greater than $\sin \theta$, the interchange switches 33 and 35 are left in their normal positions as pictured in FIG. 3 and the terms X and Y in the empirical equation are replaced by $\sin \theta$ and $\cos \theta$, respectively. For octants in which $\sin \theta$ is greater than $\cos \theta$, the interchange switches are reversed and the trigonometric values used for the terms X and Y are correspondingly reversed.

The reversing switch 41 is used to reverse the polarity of the signal from the switch 35 if necessary since the signal and reference voltage should be of the opposite polarity in order to satisfy the empirical equation and in order to provide suitable voltages for the ratio encoder.

A given set of constants for the empirical formula may be applied throughout an entire octant. However, in the preferred embodiment of FIG. 3, the error has been further reduced by considering each octant as being divided into a first interval from 0° to 22.5° and a second interval from 22.5° to 45°. A different set of constants may then be applied to each interval as determined by the position of the interval switches 59, 61 and 65.

In the presently preferred embodiment, first interval zero error points were chosen to fall at 0°, 11.25°, and 22.5°. The corresponding constants then become:

$$A_1 = 1.30656$$
$$B_1 = 0.00000$$
$$C_1 = 0.19891$$

Second interval zero error points were chosen to fall at 22.5°, 33.75°, and 45°. The corresponding constants then become:

$$A_2 = 1.75797$$
$$B_2 = 0.09879$$
$$C_2 = 0.668179$$

It will be appreciated that greater accuracy could be obtained by subdividing the octants into more intervals if so desired. The interval switches would then be replaced by switches having a corresponding number of positions.

Figure 5:
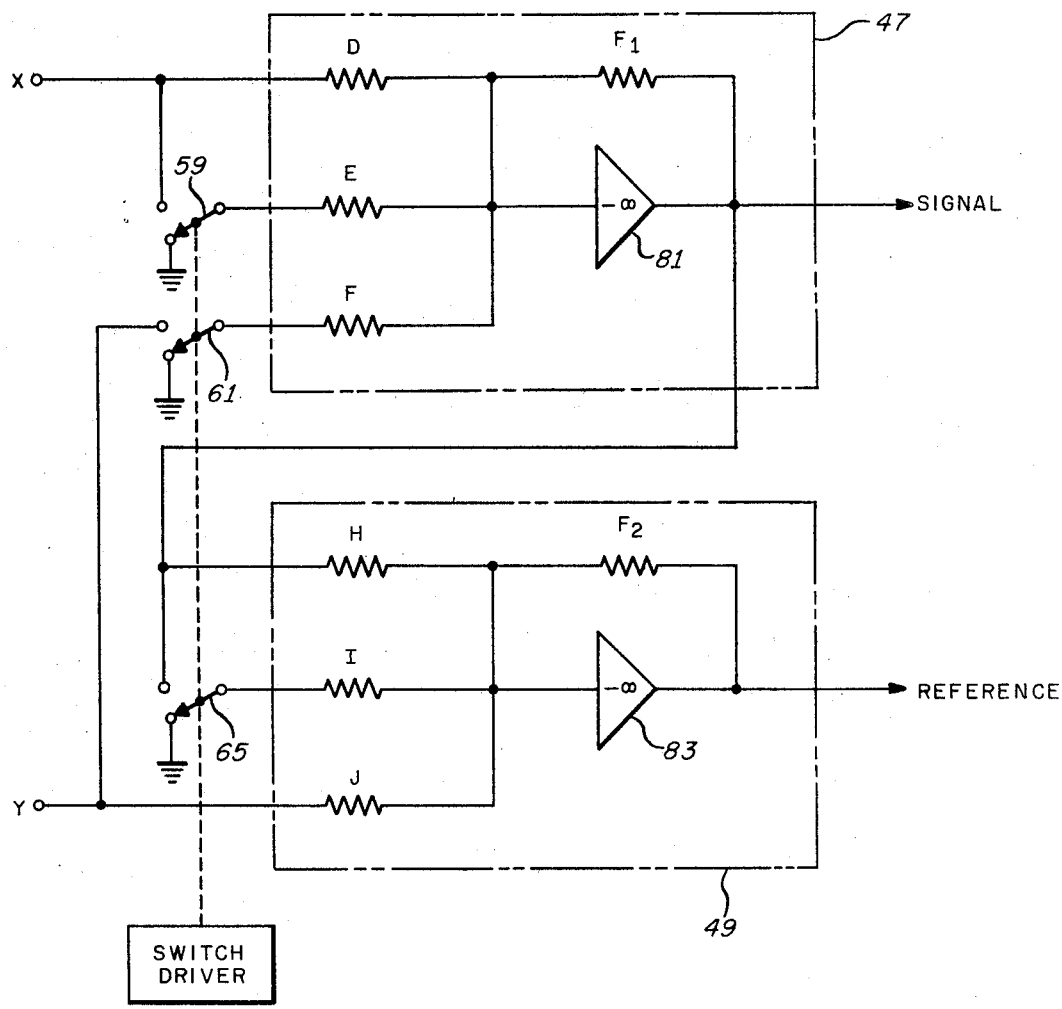
FIG. 5 is a diagram illustrating a typical linearization circuit for use in the embodiment of FIG. 3.

These particular constants were embodied in the operational amplifiers depicted in FIG. 5. The amplifying units 81 and 83 are high gain, inverting DC amplifiers.

It will be remembered that the decoding sequence consists in first determining the proper octant and then determining an interpolation angle within the octant. In order to do this, the sine and cosine signals in the higher octants must be rearranged to provide the same ratio that they would have provided if the same interpolation angle were to appear in the first octant.

By referring to FIG. 2, it can be seen that this rearrangement can be accomplished in three steps.

As explained previously, the interchange switches are used to assure that the reference voltage is always equal to or larger than the signal voltage and the reversing switch is used to assure that the polarities of the reference and signal voltages are opposite.

Thus, the interchange switches must be actuated for rotor angles in the second, third, sixth or seventh octants. The reversing switch must then be actuated for rotor angles in the first, second, fifth or sixth octants.

The third step in rearranging the signals consists in taking the ONE's complement of any interpolation result when the rotor angle lies in an even-numbered octant.

The necessity for this step can be appreciated by again referring to the graph of FIG. 2. It will be seen that the displacement of the sine or cosine function having the larger absolute magnitude decreases with increasing interpolation angles in odd-numbered octants but increases in even-numbered octants. Furthermore, the trend of displacement changes for the smaller magnitude function in any octant is opposite to that of the corresponding larger magnitude function.

The operation of the invention can be understood by referring to FIGS. 2 and 3.

Assume that a rotor angle of 10° is to be encoded. The octant determination is first made. All switches are maintained in the normal position shown in FIG. 3. Voltages representing the unknown rotor angle are then applied to the octant switch 15 as indicated in FIG. 3.

In this condition, the reference voltage from the amplifier 49 cannot pass through the encoder switches and so does not affect the indicator 23. The sine function alone actuates the indicator 23 and provides a positive reading. This is interpreted as a ONE in the table of FIG. 2.

The interchange switch is then actuated. This applies the cosine signal through the circuits 17 and 19 to the indicator 23. A positive reading will again be obtained. This is interpreted as a ONE in the table of FIG. 2.

The circuit is next prepared for comparing the absolute magnitude of the sine and cosine input voltages. Since both of these functions are of the same polarity, the reversing switch 41 is closed so as to invert the polarity of the signal applied to the reversing switch.

All of the encoder switches, including the bias switch are closed. It can be shown that in this condition, the encoder effectively inserts a series resistor having a value of 2R between each operational amplifier and the sense amplifier 21. The indicator 23 is now read. Although both the sine and cosine functions are positive, the sine function is now being passed through the inverting amplifier 39 and through the interchange switch 35 whereas the cosine voltage is applied directly to the operational amplifier 47 through the interchange switch 33. Since the cosine voltage is larger than the sine voltage, a positive indication will be obtained at the indicator 23. This is interpreted as a binary ONE in the table of FIG. 2.

Since each of these tests produced a binary ONE, the operator now knows that the rotor angle lies in the first octant.

All switches are now returned to the normal position as shown in FIG. 3. Since the cosine voltage is larger than the sine voltage, the cosine voltage is applied to the reference operational amplifier 49. However, since both sine and cosine voltages are positive, the inverter switch 41 is again closed so as to supply negative reference signals to the encoder 19.

The interpolation determination is started by first setting all encoder switches except the $2^9$ switch in the normal position as shown in FIG. 3. Since the $2^9$ switch represents 22.5°, the result of this step determines whether the unknown rotor angle is in the first interval (0°–22.5°) or in the second interval (22.5°–45°).

Since the rotor angle was assumed to be 10°, the indicator 23 will read below zero. This is interpreted to mean that the unknown rotor angle is in the first interval so that the interval switches 59, 61 and 65 are retained in the normal position shown in FIG. 3. This effectively inserts the $A_1$, $B_1$ and $C_1$ constants, previously listed, in the empirical linearization equation.

If the unknown rotor angle had been greater than 22.5°, the indicator 23 would have responded accordingly so that the interval switches 59, 61 and 65 would properly be reversed. This would effectively insert the constants $A_2$, $B_2$ and $C_2$ in the empirical linearization equation.

The $2^9$ switch is next opened and switches representing successively smaller angular values are actuated until a balance is achieved.

In the assumed case of a 10° rotor angle, the $2^8$ switch would represent too large an angle (11.25°). Therefore, after testing for a balance, this switch would be reopened.

The $2^7$ switch would next be closed. This would represent too small an angle. Therefore, this switch would be retained in the closed position while switches representing successively smaller-valued increments would be closed in sequence.

At the end of the test, $2^7$, $2^6$, $2^5$, $2^1$ and $2^0$ switches would remain closed while all other switches would remain in their normal position. The closed switches represent an angle of 9.976°. This is within the resolution capabilities of the particular encoder.

Since the octant determination indicated an angle in an odd octant, the interpolation value indicated by the encoder switches would not have to be ONE's complemented to arrive at a final result.

The final value representing the unknown rotor angle is obtained by combining the results of the octant determination and the interpolation results.

The results given in the table of FIG. 2 provide a unique combination of digits for each octant. However, it will be noticed that these are not in true binary form. The values of the table in FIG. 2, however, can be converted to true binary form by straightforward techniques, if desired.

All switches have been shown in mechanical form for purposes of explanation. It will be appreciated, however, that in a practical encoder these switches would all preferably be solid state devices.

Furthermore, the operation of the encoder has been described in terms of manual operation. In a practical encoder, straightforward logic circuits would be used to determine the sequence of switching operations as indicated functionally by logic circuit 25 in FIG. 1. Since the design of logic circuits for performing such switching operations is straightforward, the circuit 25 has been indicated only functionally in the preceding description in order to eliminate unnecessary detail.

The previous discussion has been limited to the encoding of synchro signals, however the linearization circuit permits resolver signals to be encoded in the same fashion. Thus the same device may be used for both types of input signals.

The device may be easily converted to a circuit for encoding either DC or AC analog signals by opening the cross-coupling line 67 of FIG. 3 and making the gain of each of the operational amplifiers the same. The unknown signal and a reference signal are then applied to the sin $\theta$ and cos $\theta$ terminals of the octant switch respectively. Encoding is accomplished by noting the polarity of the reference and the input signals and then reversing the polarity of the Y signal if necessary. The results of the polarity test may be used to provide a sine bit if desired.

The error curve depicted in FIG. 4 was used to illustrate the nature of error signals obtained when specific constants were used for the empirical linearization formula. This curve, it will be noticed, provides zero error at the boundaries of the octants. It should be realized that various constants may be used in the empirical linearization formula depending upon the type of error curve or the maximum error that can be tolerated.

By using the following constants, for instance, an error curve may be obtained that reduces the maximum error to approximately 2.3 minutes of arc:

$A_1 = 1.31030$ $B_1 = 0.00082$ $C_1 = 0.19817$ $A_2 = 1.76470$ $B_2 = 0.09326$ $C_2 = 0.66993$

The various constants in this latter group replace the corresponding constants tabulated previously. The resultant error curve reaches a maximum at the boundaries between adjacent intervals and between adjacent octants. This error curve passes through zero at corresponding intermediate points in each interval.

The octant determination has been described as being performed on a series basis. That is, the polarity of the sine $\theta$ is first determined, then the polarity of the cosine $\theta$ is determined and finally the comparative magnitude of these two signals is determined. It will be appreciated that these three determinations can be made simultaneously by providing parallel circuits if desired.

While the invention has been described in its perferred embodiment, it is to be understood that the words which have been used are words of description rather than limitation and that changes within the purview of the appended claims may be made without departing from the true scope and spirit of the invention in its broader aspects.

What is claimed is:

1. Apparatus for converting analog information representing an angle $\theta$ to digital form comprising means to convert the received information into corresponding voltages representing sine $\theta$ and cosine $\theta$; linearization means for producing a linear function of $\theta$; X and Y input terminals on said linearization means; operational amplifier means in said linearization means for producing signal and reference voltages in response to voltages applied to said X and Y input terminals; means to apply one of said voltages representing sine $\theta$ and cosine $\theta$ to said X terminal and the other of said voltages representing sine $\theta$ and cosine $\theta$ to said Y terminal; said operational amplifier means having a gain characteristic such that the ratio of signal-to-reference voltages is given by $$\frac{AX - BY}{Y + CX}$$

wherein X and Y represent the magnitudes of the voltages applied to said X and Y terminals, respectively, and A, B, and C are constants determining the gains of various channels in said amplifying means; a successive approximation encoder coupler to receive said signal and reference voltages and produce the digital equivalent of the angle $\theta$; and an indicating means to detect a null condition in said encoder.

2. The apparatus of claim 1 in which the operational amplifier means have gains such that $A = 1.30656$ $B = 0.00000$ $C = 0.19891$ 3. The apparatus of claim 1 in which the operational amplifier means have gains such that $A = 1.75797$ $B = 0.09879$ $C = 0.668179$ 4. The apparatus of claim 1 further including interval switching means in the input of said operational amplifier means for selectively switching the gain of said amplifier means between predetermined values.

5. The apparatus of claim 4 in which the switching means switches the gain of the operational amplifier means between a first predetermined value corresponding to $A = 1.30656$ $B = 0.00000$ $C = 0.19891$ and a second predetermined value corresponding to $A = 1.75797$ $B = 0.09879$ $C = 0.668179$ 6. The apparatus of claim 1 wherein said operational amplifier means includes first and second linear high gain amplifiers to provide said signal and reference voltages, respectively; a resistance feedback loop around each linear amplifier; resistance networks coupled to the inputs of each of said linear amplifiers; said first and second linear amplifiers being connected to receive voltages applied to said X and Y terminals, respectively, through said resistance networks; said resistance networks and said feedback resistors being proportioned to provide the desired gain characteristics.

7. The apparatus of claim 1 further including a reversing switch connected to apply selectively either one of said voltages representing sine $\theta$ and cosine $\theta$ to either one of the X and Y terminals; said apparatus further containing an inverting means for optionally inverting the polarity of a signal being applied to said Y terminal.

8. The apparatus of claim 7 further including switching means in said successive approximation encoder for optionally coupling said signal and reference voltages to said indicating means through equal resistances.

9. The apparatus of claim 7 further including switching means in said successive approximation encoder for optionally applying only said signal voltage to said indicating means.

References Cited

UNITED STATES PATENTS 3,295,125   12/1966   Idelsohn et al. _____ 340—347

MAYNARD R. WILBUR, Primary Examiner

M. K. WOLENSKY, Assistant Examiner

U.S. Cl. X.R.

235—186